United States Patent [19]

Benoit et al.

[11] Patent Number: 4,984,389
[45] Date of Patent: Jan. 15, 1991

[54] AUTOMOBILE DOOR WITH FLUSH MOUNTED GLASS

[75] Inventors: Dominque Benoit, Aurora; Jonathan Vinden, Mississauga, both of Canada

[73] Assignee: Atoma International, A Magna International Company, Newmarket, Canada

[21] Appl. No.: 346,628
[22] Filed: May 2, 1989
[51] Int. Cl.[5] .................................................. B60J 5/04
[52] U.S. Cl. ..................................... 49/502; 49/227; 49/352; 49/377; 296/146
[58] Field of Search ............... 49/374, 227, 348, 352, 49/506, 507, 502, 377, 211; 296/146, 201

[56] References Cited

U.S. PATENT DOCUMENTS

| | | | |
|---|---|---|---|
| 2,449,210 | 9/1948 | Faust | 49/452 |
| 2,650,857 | 9/1953 | Watter | 296/44 |
| 2,760,814 | 8/1956 | Watter | 296/44 |
| 3,258,877 | 7/1966 | Peras | 49/502 |
| 3,700,076 | 10/1972 | Forsting et al. | 188/1 C |
| 3,782,036 | 1/1974 | Clark et al. | 49/502 |
| 3,791,693 | 2/1974 | Hellriegel et al. | 296/146 |
| 3,829,149 | 8/1974 | Stevens | 296/28 R |
| 3,868,141 | 2/1975 | Johnson | 296/28 R |
| 3,874,119 | 4/1975 | Renner et al. | 49/502 |
| 3,883,171 | 5/1975 | Bauer | 296/28 R |
| 3,887,227 | 6/1975 | Deckert | 296/28 R |
| 3,907,358 | 9/1975 | Barenyi et al. | 296/146 |
| 3,936,090 | 2/1976 | Aya et al. | 296/146 |
| 3,938,288 | 2/1976 | Roubinet | 52/615 |
| 4,001,971 | 1/1977 | Gobush | 49/227 |
| 4,013,317 | 3/1977 | Reidelbach et al. | 296/146 |
| 4,018,475 | 4/1977 | Richtermeier | 296/28 R |
| 4,056,280 | 11/1977 | Bauer et al. | 296/146 |
| 4,090,734 | 5/1978 | Inami et al. | 296/146 |
| 4,105,243 | 8/1978 | Geiger | 296/28 R |
| 4,196,929 | 4/1980 | Bauer | 296/31 R |
| 4,290,235 | 9/1981 | Jahnee et al. | 49/502 |
| 4,290,641 | 9/1981 | Miyauchi et al. | 296/146 |
| 4,300,315 | 11/1981 | Holzwarth | 49/501 |
| 4,306,381 | 12/1981 | Presto | 49/502 |
| 4,307,911 | 12/1981 | Pavlik | 296/188 |
| 4,328,642 | 5/1982 | Presto | 49/502 |
| 4,369,608 | 1/1983 | Miura et al. | 52/309.9 |
| 4,378,395 | 3/1983 | Asoshina et al. | 428/158 |
| 4,397,914 | 8/1983 | Miura et al. | 428/43 |
| 4,405,173 | 9/1983 | Piano | 296/146 |
| 4,416,088 | 11/1983 | Feucht et al. | 49/502 |
| 4,428,157 | 1/1984 | Engelsberger et al. | 49/502 |
| 4,434,580 | 3/1984 | Engelsberger et al. | 49/502 |
| 4,451,518 | 5/1984 | Miura et al. | 428/137 |
| 4,488,751 | 12/1984 | Kling | 296/146 |
| 4,491,362 | 1/1985 | Kennedy | 296/1983 |
| 4,512,240 | 4/1985 | Mahler et al. | 98/2.04 |
| 4,561,211 | 12/1985 | Raley | 49/227 |
| 4,575,967 | 3/1986 | Bickerstaff | 49/227 |
| 4,603,894 | 8/1986 | Osenkowski | 292/216 |
| 4,648,208 | 3/1987 | Baldamus et al. | 49/502 |
| 4,651,470 | 3/1987 | Imura et al. | 49/502 |
| 4,662,115 | 5/1987 | Ohya | 49/502 |
| 4,691,476 | 9/1987 | Yao et al. | 49/374 |
| 4,695,499 | 9/1987 | Whitener | 428/122 |
| 4,704,822 | 11/1987 | Srock et al. | 49/502 |
| 4,711,052 | 12/1987 | Maeda | 49/502 |
| 4,747,232 | 5/1988 | Stephenson | 49/502 X |
| 4,783,930 | 11/1988 | Tiesler | 49/227 X |

FOREIGN PATENT DOCUMENTS

| | | |
|---|---|---|
| 617915 | 4/1961 | Canada . |
| 988124 | 4/1976 | Canada . |
| 0061131 | 9/1982 | European Pat. Off. . |
| 0072537 | 2/1983 | European Pat. Off. . |
| 0077401 | 4/1983 | European Pat. Off. . |
| 0099119 | 1/1984 | European Pat. Off. . |
| 0127591 | 5/1984 | European Pat. Off. . |
| 0119775 | 9/1984 | European Pat. Off. . |
| 0131193 | 1/1985 | European Pat. Off. . |
| 0148987 | 7/1985 | European Pat. Off. . |
| 3520479 | 10/1986 | Fed. Rep. of Germany . |
| 2101535 | 1/1983 | United Kingdom . |
| 2117329 | 10/1983 | United Kingdom . |
| 2149726 | 6/1985 | United Kingdom . |

Primary Examiner—Gary L. Smith
Assistant Examiner—Jerry Redman

[57] ABSTRACT

The disclosure relates to an automobile door and the method of assembly thereof to be mounted in a door frame of an automobile. The invention comprises a gripping assembly on the window releaseably interacting with an outer belt reinforcement member to stop and locate a bottom edge of the window. The door assembly further comprises an adjustment module whereby the upper edge of the window may be positioned flush to the outer door frame.

12 Claims, 15 Drawing Sheets

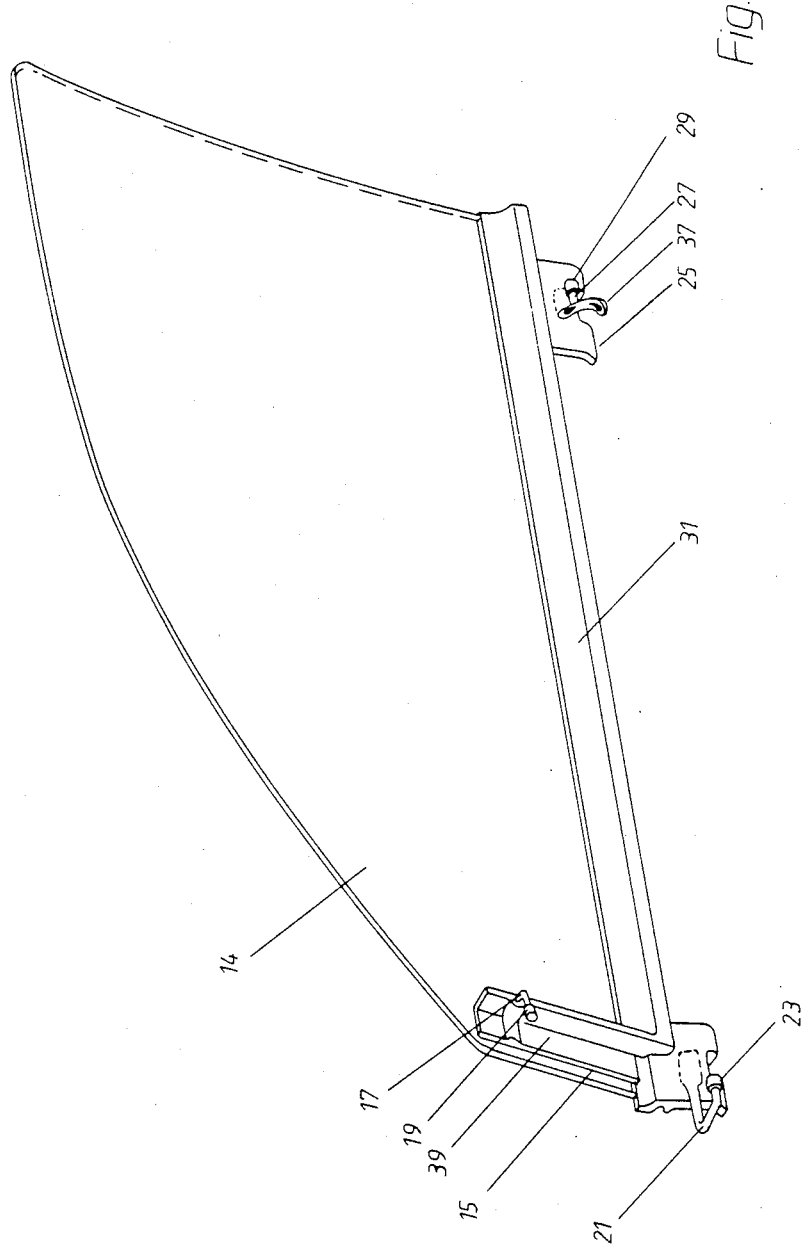

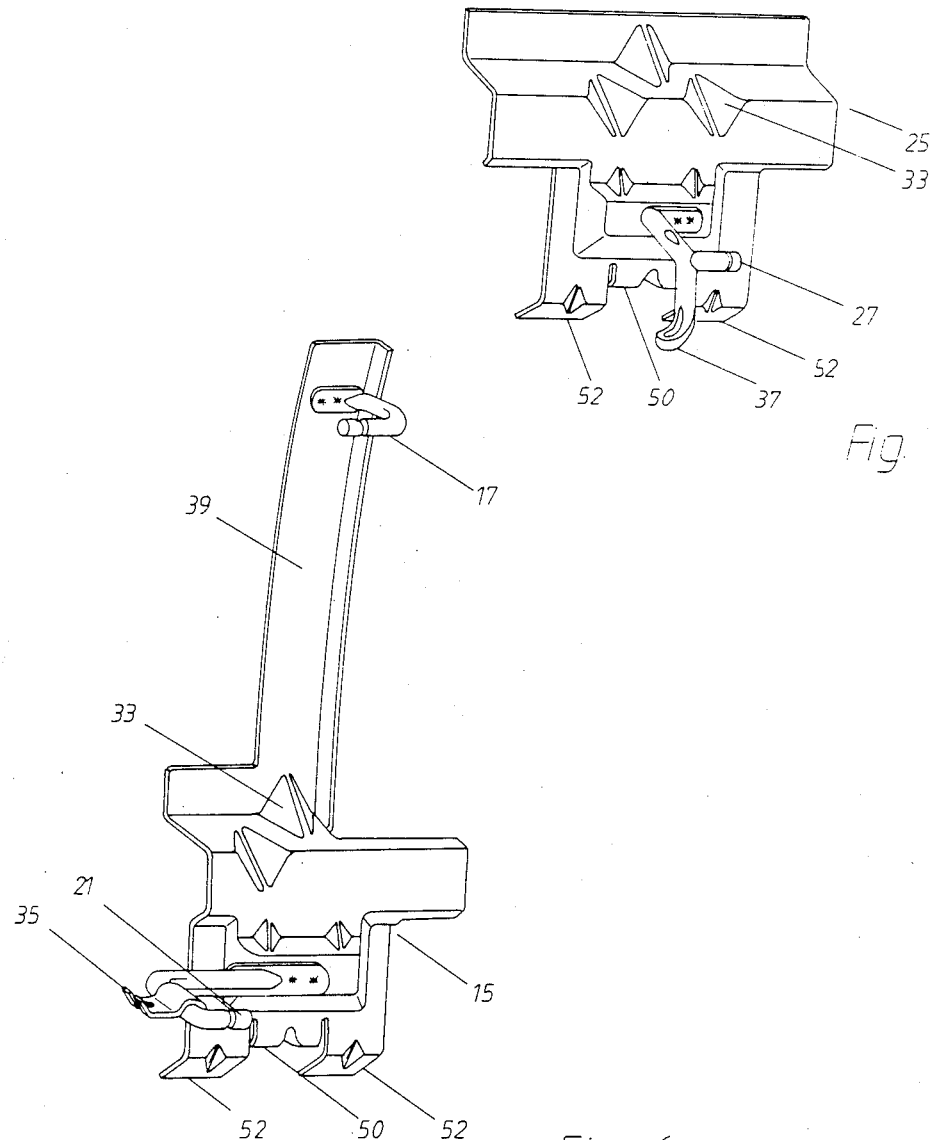

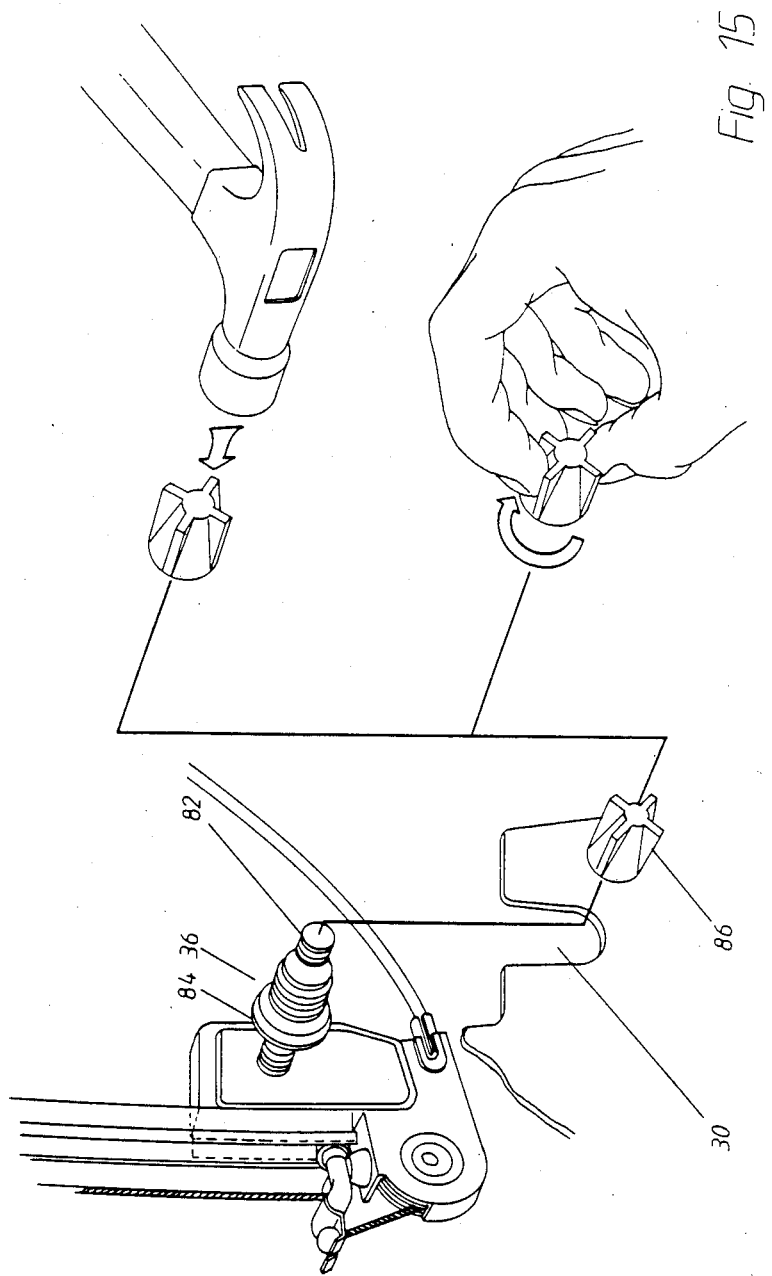

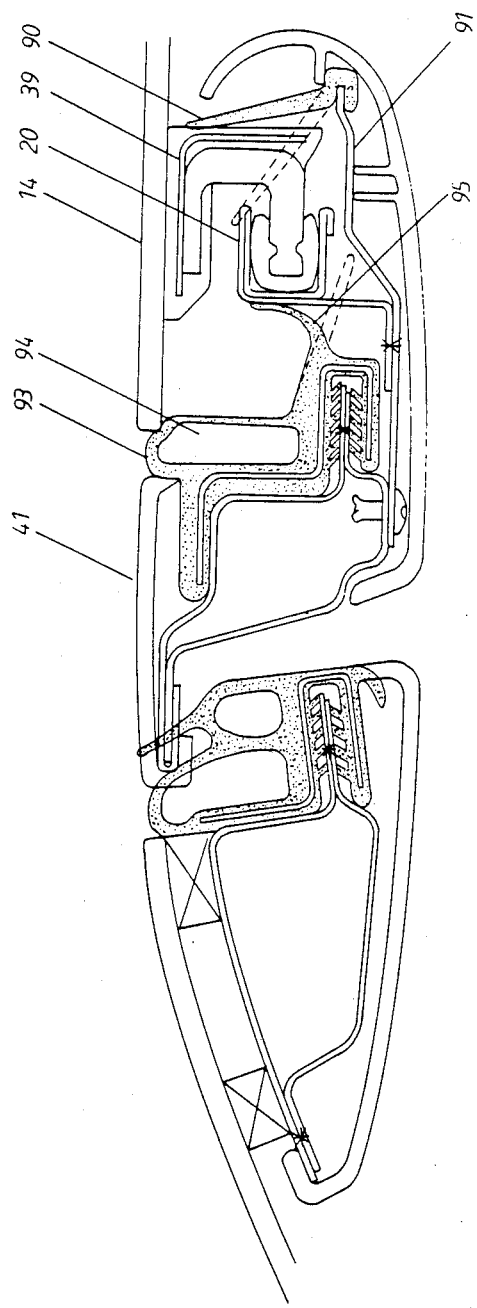

AUTOMOBILE DOOR WITH FLUSH MOUNTED GLASS

FIELD

This invention relates to a car door assembly, particularly a car door adapted to present a completely (i.e. four-sided) flush mounted glass in the side windows of the car.

BACKGROUND

Aerodynamic designs of automobiles tend to reduce drag and wind noise. An aspect of aerodynamic design of special interest in this disclosure is the reduction of drag and wind noise around side windows. Conventional wisdom suggests that this reduction can be achieved by flush mounting of the windows. There are, however, numerous difficult design problems associated with this objective, particularly in the methods and means of sealing, reinforcement of the outer panel about the window, control of the glass and in the design for assembly of parts which when assembled must fit flush to each other notwithstanding that the parts can vary in size and shape within reasonable tolerances and can originate from different manufacturers. Some solutions have been proposed and patents have been granted. Those of which the applicant has knowledge are:

Patent No.: European 0 119 775
Date of issue: Sept. 26/84
Title: Vehicle Body Structure This patent discloses a door with front upper and rear-frame members which define a window aperture, a guide for the front of the glass within the door body and a guide for the rear of the glass in the rear frame member.

U.S. Pat. No.: 4,561,211
Date of issue: Dec. 31/85
Title: Vehicle Door and Window Assembly This patent discloses a vertical window assembly which provides for substantially flush mounting with adjacent door sides and the exterior belt line. Particular guide rails and seals are disclosed.

U.S. Pat. No.: 4,575,967
Date of issue: Mar. 18/86
Title: Flush Glass Window Regulator This patent discloses a window which is slid along guides in an upper position until an upper edge of the window is guided into engagement with a sealing means, then the lower edge is guided outwardly into engagement with a seal having an inward facing sealing surface so that the outer surface of the glass is substantially flush with the outer surface of the vehicle body.

U.S. Pat. No.: 4,691,476
Date of issue: Sept. 8/87
Title: Vehicle Door Structure This patent discloses a window fitted into a vertical groove in a door, an adhesive adapted to secure the door window in the groove with a slider. The upper portion of the slider is adapted to seal the adhesive to prevent it from spreading out onto the upper surface of the slider.

Patent No.: Europe 0 148 987
Publication date: July 24/85
Title: Construction of a Door in a Motor Vehicle This patent discloses a flush mounted window disposed in a slider guided by channels on the door frame to achieve substantially flush mounting of the glass. An end portion of the door glass has an outwardly convex curvature in cross-section to the vertical line of the door. Off-setting is achieved by movement of the slider.

Patent No.: Europe 0 127 591
Publication date: Can 12/84
Title: Guide Device for Sliding Glasses of Motor Vehicles and Method of Manufacturing Same This patent discloses a guide device having a rigid core at least partially embedded in the body of the weather strip.

While each of these patents discloses structures that can have certain advantages none of these patents teaches the present invention which provides an original combination and process for mounting the glass in a door so that it can be flush with the outer panel on all four sides of the glass when it is raised to the closed position.

OBJECTS

It is an object of the present invention to provide a unique combination of apparatus adapted to obtain a four-sided flush mounted glass in an automobile door window.

It is an object of this invention to provide an assembly method for obtaining four-sided flush mounted glass in an automobile door window.

SUMMARY OF THE INVENTION

In this specification, the words "top" or "upper" and "bottom" or "lower" and the like are used to describe directions in a vertical plane of an automobile. The words "front" and "rear" or the like will be used to describe directions in a horizontal plane as would apply to the orientation of an automobile. The words "inside" or "outside" will be used to indicate, in a plane transverse to the plane of the door panels, a direction toward the interior of the car or the exterior of the car, respectively. The word "belt" is used to describe the area of a door proximate to a horizontal plane between the bottom of the door glass and the outer panel of the door when the window is closed.

The present invention includes an automobile door adapted to be mounted in a door frame of the automobile body, said door having:

a door shell including an outer panel, a hinge member and a latch member, an intrusion beam and an outer belt reinforcing means attached inside the outer panel, a window adapted to fit flush to the door frame and the outer panel, window sealing means adapted to lie between the window and adjacent parts of the door frame and the outer panel, a window drive means adapted to move the window, a window guide means adapted to guide the window throughout its motion, gripping means on the window adapted to interact releaseably with the outer belt reinforcement member to stop and locate a bottom edge of the window flush to the outer panel, and adjustment means adapted to permit adjustment of an upper edge of the window to be located flush to the door frame.

It is preferred that the window, window drive and guide means, the gripping means and the adjustment means be connected to an inner belt reinforcement means, all of which is adapted to be installed as a module in the door shell. The module can be adapted to be fastened to the door structure by a first fastening means located in the inner belt reinforcement means and by a second fastening means disposed on the module at a location lower than the first fastening means. The second fastening means can be adapted with the adjustment means to permit the module to be rotatably adjusted about a horizontal axis proximate to the inner belt reinforcement means to permit the upper edge of the window to be positioned flush to the door frame.

More particularly, the automobile door of this invention, which is adapted to be mounted in a door frame of the automobile body, has the following components in combination:

(1) a door shell including an outer panel, a hinge member and a latch member, an intrusion beam and an outer belt reinforcing means attached inside the outer panel;

(2) a module including,
an inner belt reinforcement means,
a window adapted to fit flush to the door frame and the outer panel,
window sealing means adapted to seal about the perimeter of the window,
a window drive means adapted to move the window,
a window guide means adapted to guide the window throughout its motion,
gripping means on the window adapted to interact releaseably with the outer belt reinforcement member to stop and locate a bottom edge of the window flush to the outer panel, and
adjustment means adapted to permit adjustment of an upper edge of the window to be located flush to the door frame.

The module is adapted to be hung on the door shell by at least first fastening means located in the inner belt reinforcement means and second fastening means disposed on the module at a location lower than the first fastening means. The module and the door shell are also adapted to permit the module or parts thereof to be slid rearward, forward, in and out or up and down before the fastening means are locked in place to allow initial adjustment of the module to place the window in a correct location in the door shell and to permit the gripping means to draw the lower edge of the window flush to the outer panel as the window is closed, thereby accommodating dimensional tolerances of the door parts. The second fastening means can be further adapted with the adjustment means to permit the module to be rotatably adjusted about a horizontal axis proximate to the inner belt reinforcement means to permit the upper edge of the window to be positioned flush to the door frame.

The gripping means is attached along a bottom edge of the window and comprises hooks and stops, being adapted to catch releasably in the outer belt reinforcement means as the window is driven upward to a closed position. Anchor means, adapted to connect to the drive means, is attached along the bottom edge of the window.

At least first, second and third follower means are attached to the window with the second follower means displaced vertically below said first follower means and horizontally forward of said third follower means. The window guide means comprises at least first, second and third track means being adapted to guide corresponding follower means during the up and down motion of the window. The first and second track means are adapted to control rotation of the window about a horizontal axis. In combination with the third track means they control rotation of the window about a vertical axis. The second and third track means are directed outwardly near the belt line to guide the bottom of the window towards the outer panel as it nears the closed position to allow the gripping means to interact with the outer belt reinforcement means. The path of the track means is routed by conventional means to guide the window past obstructions in the door as it moves up and down. It will be appreciated by those skilled in the art how the novel three track design can be used to obtain the required rotational and translational movements to manipulate the window.

The window drive means can be any of a number of suitable conventional systems. It is preferred, however, that a cable and pulley system be used. The cables can be attached to the window at the anchors near the second and third follower means. The preferred system has cables which cross in an "X" pattern near the centre of the door where they are connected to the driver means, which can include a motor or crank. Suitable pulleys are placed proximate to the ends of the second and third track means to guide the cables. It can be appreciated that at least one of the anchor locations will be above a pulley and at least one below a pulley to permit the cables to pull the window fully up and then be able to pull down from that closed position.

The automobile door of this invention can have a door with or without a frame for the glass. The automobile door described in this disclosure has an outer panel, preferably made of sheet metal which is stamped, hemmed and welded to a hinge member and a latch member. An outer belt reinforcement member would be bonded thereto on the inside of the outer panel below the belt line. Conventional means can be adapted to obtain this outer door shell. It will be appreciated that other door constructions can used without departing from the principles of the present invention.

The frontal crash beam or inner belt reinforcement member of this invention doubles as a carrier for a hardware module which carries the window and window regulator and other hardware components. This design permits the door sheet metal to be manufactured without a cross member located at the belt line and provides for unimpeded access for loading of the glass and the hardware module which becomes important for robot assembly operations. The advantages of this aspect will become apparent from the description of the preferred embodiments.

The present invention also discloses means for obtaining full control of glass movement in two degrees of freedom while raising or lowering the glass in a third degree of freedom of movement. The present design provides the control with a minimum of three control points while maintaining sufficient rigidity to provide stability to the glass during movement. The control objectives are obtained by a follower (e.g., a roller) and track arrangement which directs the window along an exact predetermined sequence of movements in three directions.

The present invention also utilizes the new technology of RIM (reaction injection molding) to obtain a partial glass encapsulating structure with adequate reinforcement to permit repeatable and tight control of the glass movement. The encapsulating method permits the attachment of hooks and stops which are adapted to interact with portions of an outer belt reinforcement member to locate the glass in the closed position to be flush at the belt line, to facilitate assembly operations and to strengthen the glass in the closed position.

The invention also provides an assembly structure which facilitates adjustment during assembly to obtain flush mounting, notwithstanding differences in sizes and shapes of materials within reasonable tolerances typical in manufacturing operations.

BRIEF DESCRIPTION OF THE DRAWINGS

FIG. 5 is a drawing of the semi-encapsulated glass and reinforcements.

FIG. 6 is a detail of the front glass reinforcements.

FIG. 7 is a detail of rear glass reinforcements.

FIG. 15 illustrates the locking means for the adjuster.

FIG. 16 shows the seals in the sail area.

DETAILED DESCRIPTION OF THE DRAWINGS

Figure 1:
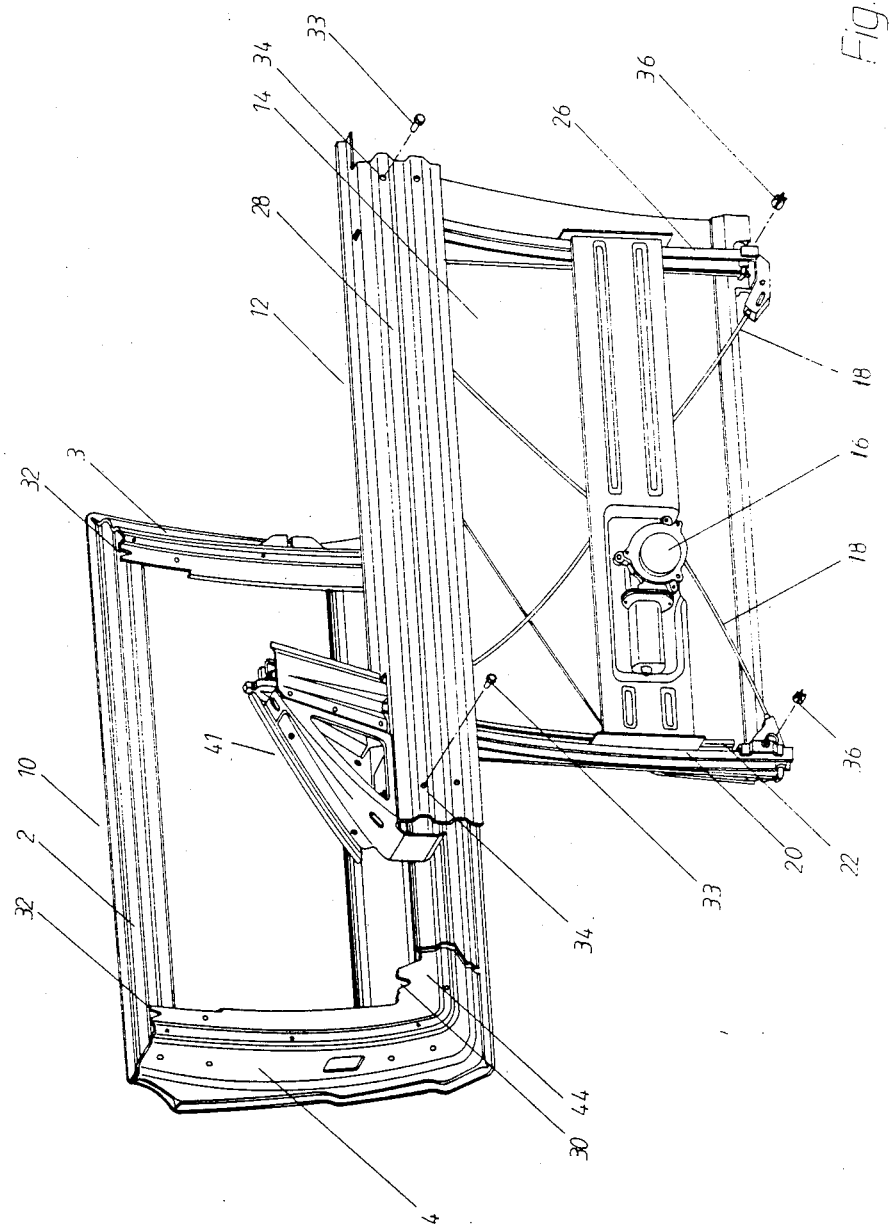
FIG. 1 is an exploded view of the main components of a door assembly in the preferred embodiment of this invention.

In FIG. 1, the general outer door structure (10) is shown disassembled from the hardware module (12). The hardware module (12) includes the door glass (14), the window regulator parts including the crank or motor (16), cable (18) and pulleys (24), the window guidance tracks (20), (22) and (26) and followers or rollers (19), (23) and (29) (which are described in more detail later) and the inner belt reinforcement member (28). The hardware module (12) can contain other components as well, such as speakers, door release mechanisms and controls, etc., but for simplicity and clarity these items have been omitted in this description.

The hardware module (12) is adapted to be fitted onto the outer door structure (10) and to be fastened thereto. Open-ended slots (30) and (32), which are located respectively at the bottom of and at the top of the door structure (10), are adapted to receive bolts (33), loosely located in bolt holes (34) on the inside of the inner belt reinforcement member (28), and adjusters (36) adapted to be located on the inside bottom portion of the module (12). The slots (30) and (32) provide a convenient and accessible means to hang the module (12) on the door structure (10).

Figure 2:
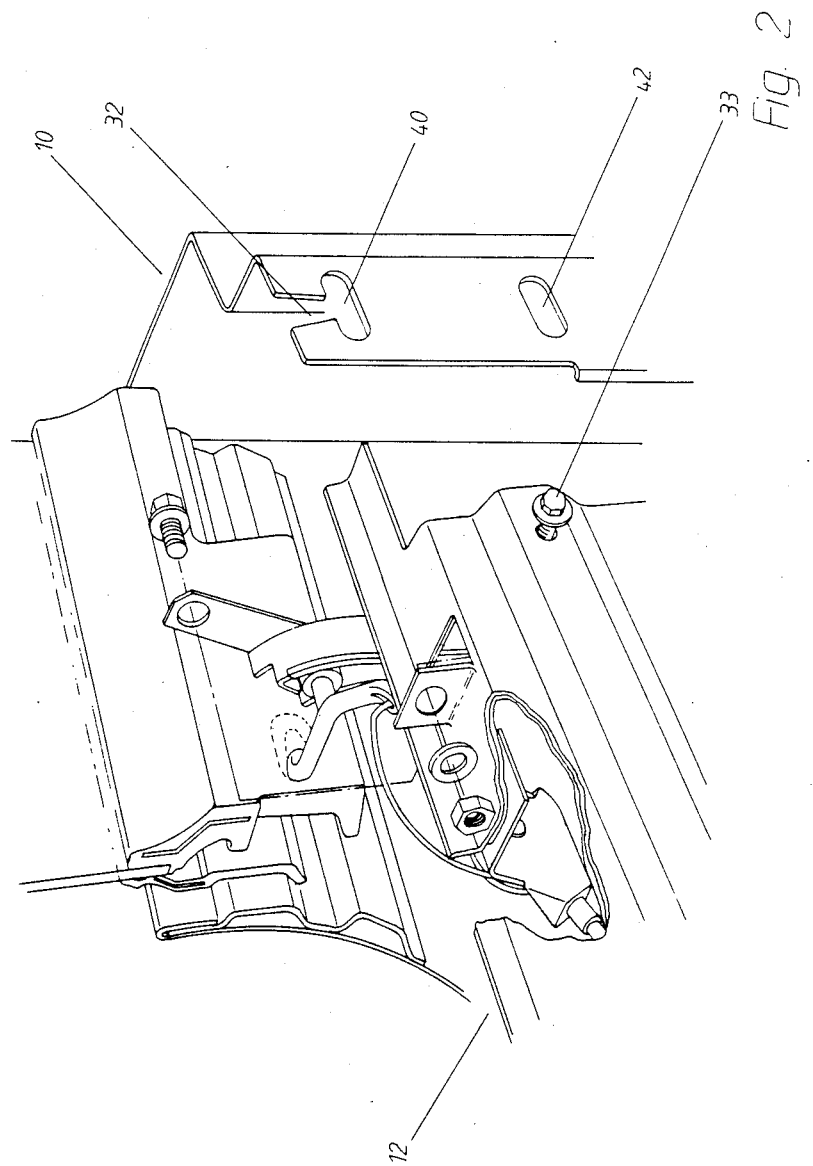
FIG. 2 is a detail of the upper rear hanging slot of the preferred embodiment of this invention.
Figure 3:
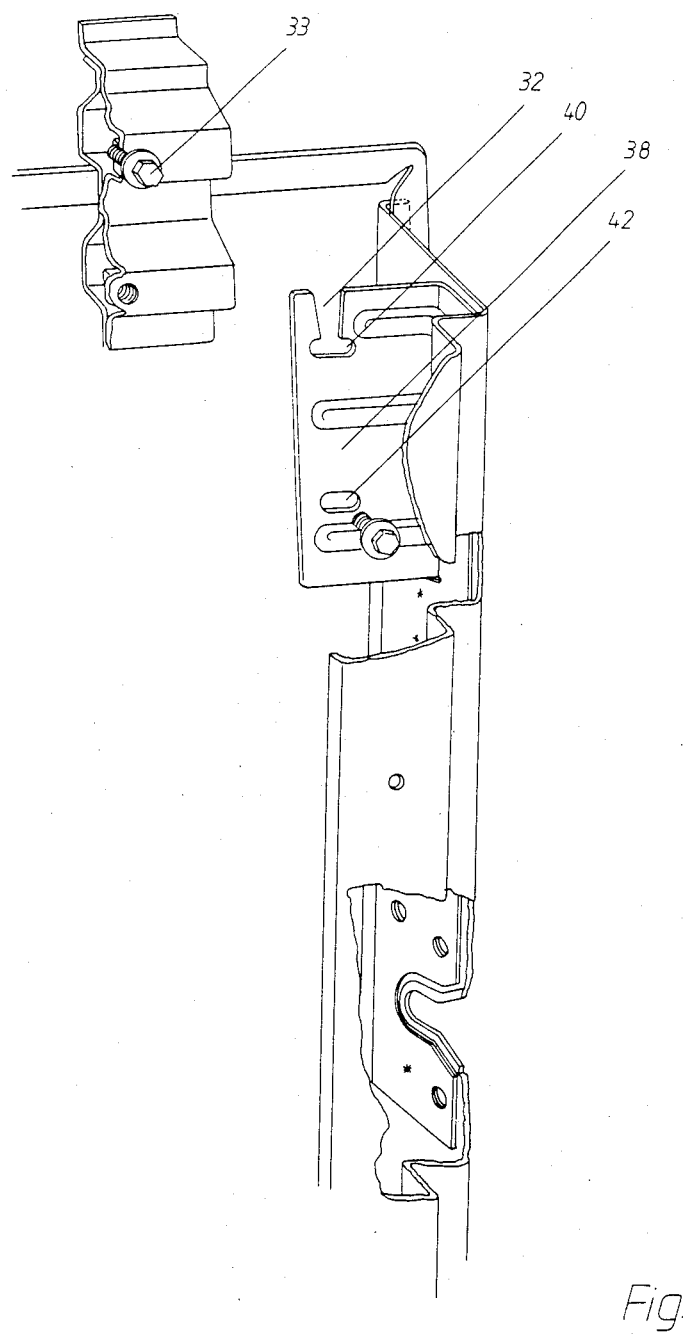
FIG. 3 is shows an alternative sheet metal configuration for the upper rear hanging slot of the preferred embodiment of this invention.

As illustrated more particularly in FIG. 2, the module (12) is hung in the door structure (10) by means of loosely connected bolts (33) which slide into open ended slots (32). The weight of the module (12) is thereby transferred to the door (10) but the module (12) is still free to be adjusted in place. It will be appreciated that the slots (32) can be formed in the hinge and latch members (4) and (6), respectively, as shown in FIGS. 1 and 2 or they can be formed in reinforcing flanges (38) as shown in FIG. 3. The slots (32) will preferably have elongated portions (40) as illustrated in FIGS. 2 and 3 to permit front and rear sliding movement for adjustment during assembly. It will also be appreciated that additional bolts and bolt holes will be provided for final connection of the two parts and that these bolt holes (42) can also be elongated as shown in FIGS. 2 and 3 to permit adjustment of the module (12) in the door (10).

Figure 4:
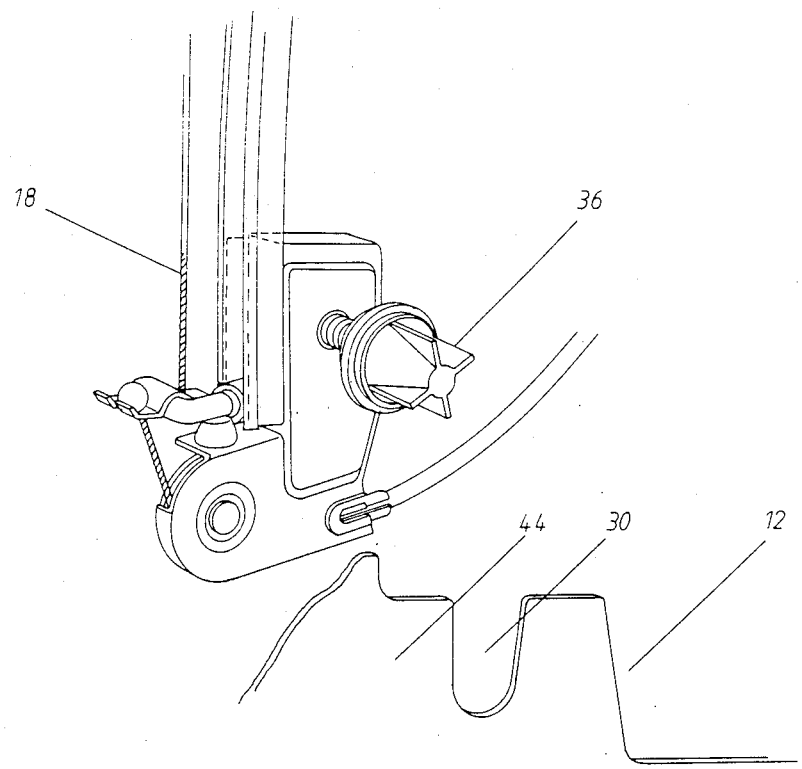
FIG. 4 is a detail of the lower slot and an adjuster of the preferred embodiment of this invention.

As shown in FIG. 4, the adjusters (36) are adapted to be slid into oversized slots (30) to connect the lower part of the module (12) to the door. As shown in FIG. 1, the slots (30) can be located in flanges (44) to provide rigidity and strength.

The semi-encapsulated glass is shown in FIG. 5. The glass (14) is semi-encapsulated in a RIM molding process. This semi-encapsulation encompasses and attaches steel reinforcement brackets (15) and (25). These brackets not only provide strength and rigidity to the glass but also serve as anchors for the window control cables, locate pins to carry the rollers and provide the stops necessary to obtain the desired window control. Details of the steel brackets (15) and (25) are shown in FIGS. 6 and 7. Each bracket is a stamped steel section reinforced at its bends by divots (45).

Figure 9:
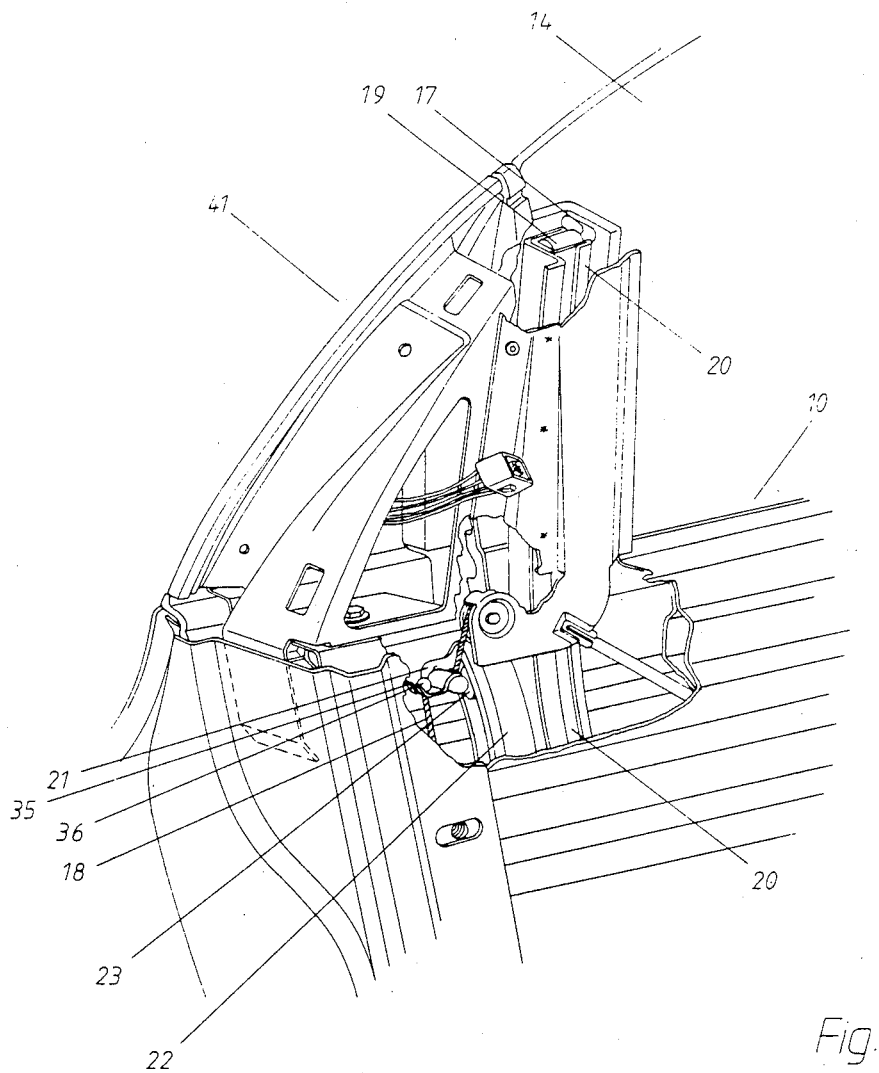
FIG. 9 shows the track design in the front sail area.

The front steel reinforcement bracket (15) is shown in detail in FIG. 6. Bracket (15) has an L-shaped member (39) adapted to support the front of the glass. The upper front roller pin (17) is welded near the top of its inside surface. The lower front roller pin (21) is welded to the inside surface near the bottom of the bracket (15). As shown in FIG. 9, the window regulator cables (18) can be secured to the inward projecting stem of roller pin (21) in a slotted anchor lug (35). The window control cable can terminate at a ball (36) which is fastened in the receptacle of anchor lug (35). Window locating hook (50) and stops (52) are shown at the bottom of bracket (15). The hook (50) is bent outwardly and upwardly while the stops (52) are bent outwardly and downwardly.

The rear steel reinforcing bracket (25), shown in FIG. 7, supports rear roller pin (27) which extends horizontally from the rear side of the inward and downward projecting anchor hook (37) which is welded to the inside of bracket (25). The window regulator cables (18) are adapted to be fastened to anchor hook (37). The rear bracket (25) is also adapted, similarly to the front bracket (15), with a hook (50) and stops (52).

The vertical separation of roller pins (17) and (21) permits control of the rotation of the glass about a horizonal axis lying in the plane of the glass. The separation of pins (21) and (27) in a horizontal plane permits control of rotation of the glass about a vertical axis in the plane of the glass. Therefore, manipulation of the three roller pins allows control of any desired rotation of the glass. Of course, the pins also can be shifted up, down, front, back or laterally to control any desired translational movement of the glass even while rotational movement is in progress. Pin manipulation and movement is determined by the tracks (20), (22) and (26).

The tracks (20), (22) and (26) guide and control the movement of the rollers, the roller pins and accordingly the glass (14) as it is driven by the cables of the window regulator mechanism between open and closed window positions. As shown in FIG. 5, each roller pin (17), (21) and (27) is fitted with a roller (19), (23) and (29), respectively. The rollers fit and roll within the tracks in a conventional way to guide the movement of the glass (14).

Figure 8:
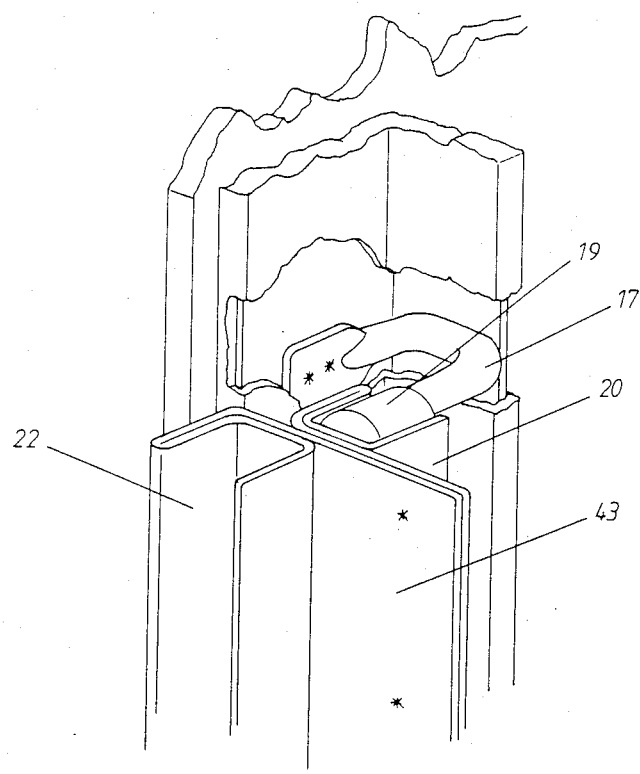
FIG. 8 is a drawing of the track and roller arrangement of the preferred embodiment of this invention.

FIG. 8 illustrates the novel arrangement of the upper front track (20) and lower front track (22) which are juxtaposed but face in opposite directions. This arrangement simplifies the manufacture of the tracks and allows them to be each in close proximity to the glass (14). Each track can be bent separately, then jigged and spot welded to the other along flange (43).

FIG. 9 shows detail of the tracks (20) and (22) in the sail area (41). It can be observed that track (20) continues to the top of the sail area to deliver the glass top front to a location flush with the top of the sail area (41). Track (22) curves outwardly to deliver the bottom of the glass (14) flush to the top of the outer panel of the door (10). The rear track (26) operates similarly to track (22) to deliver the bottom of the glass (14) flush to the top of the outer panel. When the glass is delivered to the closed position it is further secured by locating hooks (50) and stops (52) on brackets (15) and (25).

Figure 10:
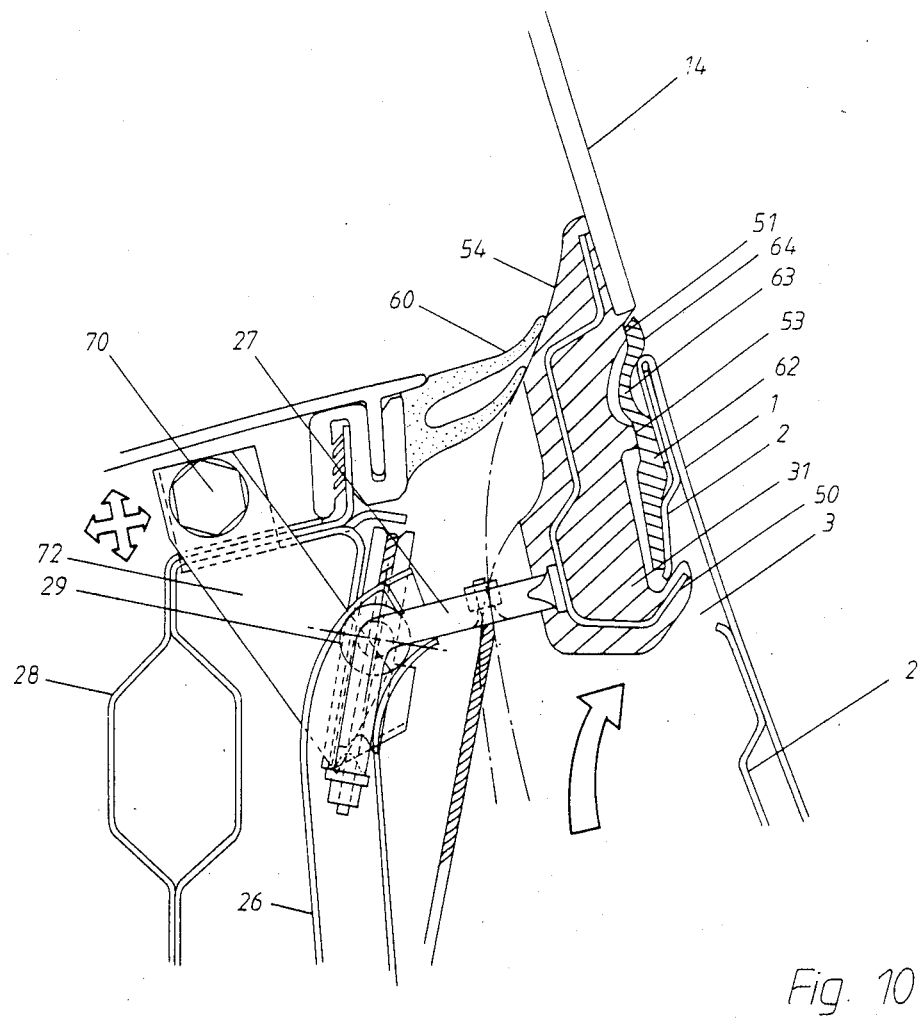
FIG. 10 is a drawing of the hook means and adjustment means of the preferred embodiment of this invention.

FIG. 10 provides a side view of the hooks (50) in operation. As illustrated, the outer panel (1) is hemmed over the outer belt reinforement hat section (2). An opening (3) is provided to accept hook (50). The opening (3), which appears in the cross section as a break in hat section (2), is slightly wider than the hook (50) in the horizontal. The hook (50) is encapsulated in plastic mold (31) and, thereby, adapted with a first step (51), a second step (53) and a curved seat (54). An inner belt seal (60) is adapted to lie against curved seat (54) and to cover the gap between the inside of the door and the glass (14). This seal is adapted to wipe the inside surface of the glass while extending upwardly. The seal thereby effectively prevents pinching of fingers as the glass moves inwardly as it begins its downward travel from the closed position.

An outer belt seal (62) is bonded or clipped to the inside of the outer panel (1) and the outer belt reinforcement hat section (2) along its lower portion. The top portion of the outer belt seal (62) comprises a flap (63) and a lip (64) which may be biased inwardly and downwardly by an optional spring imbedded therein. As the glass (14) is lowered the seals (60) and (62) wipe the opposing glass surfaces. When the glass (14) is fully down, the flap (63) and lip (64) bend inwardly to lie over inner belt seal (60) to close the gap between them to present a finished surface and to prevent things from being accidentally dropped into the door. As the window is raised both the inner and outer belt seals wipe the glass and bend the seals back.

As the lower rollers (in this case roller (29)) reach the top of their tracks (in this case track (26)) the bottom of the glass (14) is directed outwardly following the curve of the tracks (note the curvature of track (26)). Roller pin (27) translates the outward movement to the plastic encapsulation (31) to cause hook (50) to catch under the top of opening (3) in the hat section (2). Step (53) seats against outer belt seal (62). Step (51) is adapted to push lip (64) flush to the outer panel (1) and the glass (14) when the hook (50) is set and step (53) is seated. The effect is to create a water tight seal at step (53) and a water and wind screen at step (51).

When hook (50) catches in the outer belt reinforcement hat section (2) it tends to pivot outwardly thereby pressing steps (51) and (53) onto outer belt seal (62) and augmenting the sealing action. Hook (50) and stops (52) stop the movement of the glass at a predetermined location to ensure repeatable redelivery of the glass to the same location flush with the outer panel (1).

It can be noted in FIG. 10 that the position of track (26) is adjustable by means of bolt (70) which extends through a flange of the inner reinforcement member (28) and bracket (72) on which track (26) is located. It will be appreciated that track (26) can be secured adjustably in a variety of ways without departing from the scope of this invention.

Figure 11:
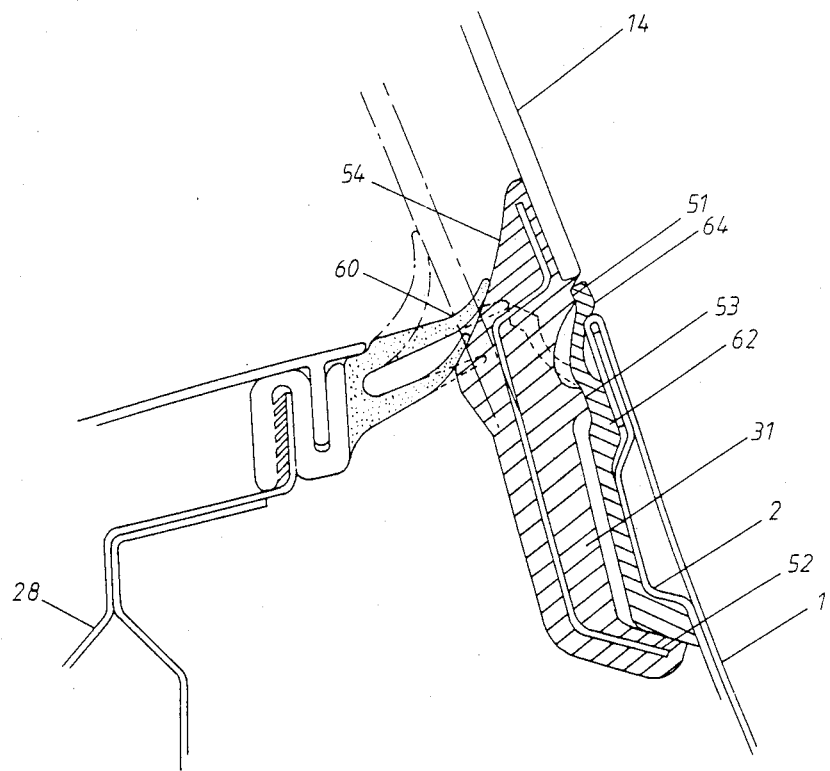
FIG. 11 is a drawing of stop means of the preferred embodiment of this invention.

FIG. 11 illustrates a section of the glass encapsulation through the stops (52). Again the inner belt seal (60) wipes the inside of the glass (14) and rests against seat (54) when the glass (14) is fully closed. The outer belt seal (62) wipes the outside of the glass (14) and overlays the inner belt seal (60) when the window is fully open. Lip (64) provides a water and wind screen flush to the glass (14) and the outer panel (1) under the action of step (51). Step (53) provides the water seal as described above. The stop (52) does not hook into the hat section (2) but merely presses upwardly and outwardly against it. The angle of abutment of stop (52) to the hat section (2) is substantially perpendicular to the direction of movement of the glass at the time of abutment, therefore there is an effective stopping action.

The outer belt seal (62) extends downward under the outer belt reinforcement hat section (2) to provide a resilient, sound deadening section surface for the stops (52).

As illustrated in FIG. 16, in the lower sail area a vertical seal is obtained against the L-shaped member (39) by a sail area wiper seal (90). This seal not only wipes the member (39), but also conceals the tracking mechanism in the window down position. Since it extends along the inward depth of the member (39), it will cover the gap between the member (39) and the sheet metal (91) while the glass (14) moves in and out in the course of its up and down travel. When the glass (14) is fully down the seal (90) is biased to flap forward to cover the track (20).

Similarly the side seal (93) is adapted to accommodate inward and outward movement of the glass (14) as it travels up and down. Seal (93) has a rectangular box section (94) which seals the glass (14) as it moves in and out. It also has a flap (95) which wipes the front of the track (20).

The combination of the hooks (50) and the stops (52) tend to grip the outer belt reinforcement hat section (2) thereby transmitting the rigidity of the outer belt reinforcement hat section (2) to the glass (14). Conversely, the gripping action transmits the rigidity and structure of the window and the window regulator mechanism to the outer belt reinforcement hat section (2).

Figure 12:
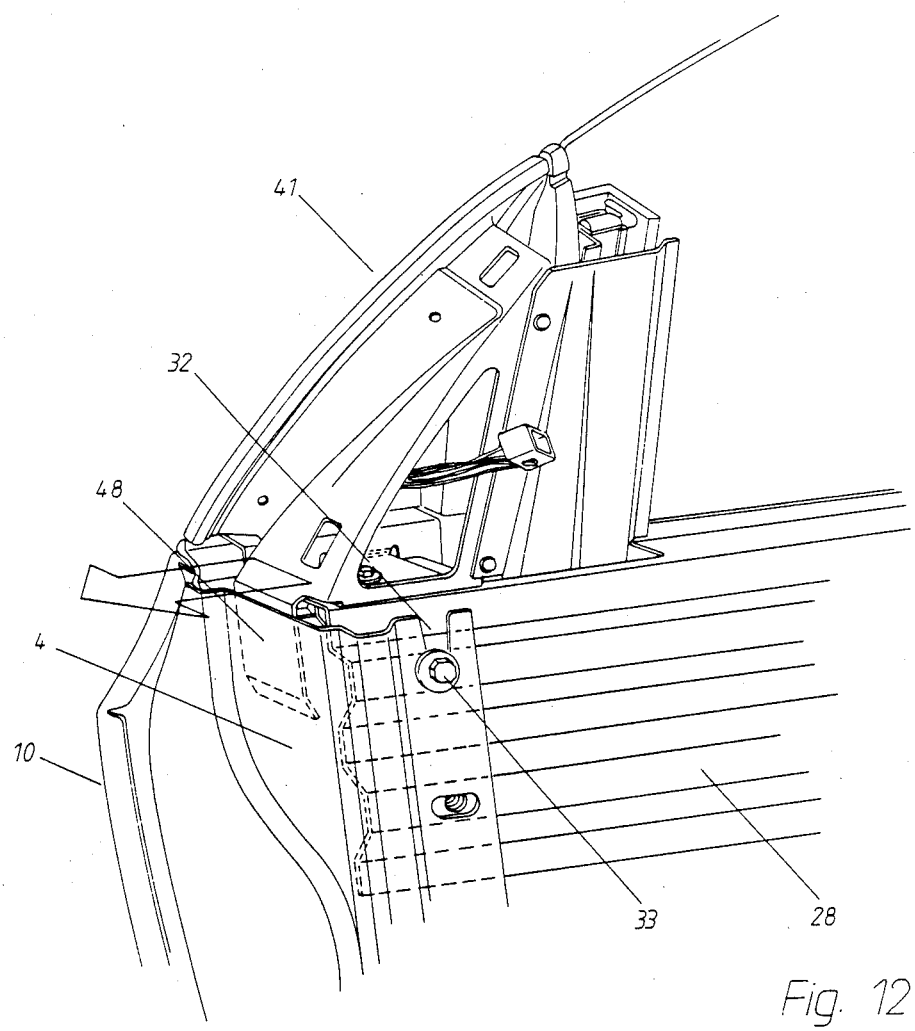
FIG. 12 illustrates the assembly of the sail area.
Figure 13:
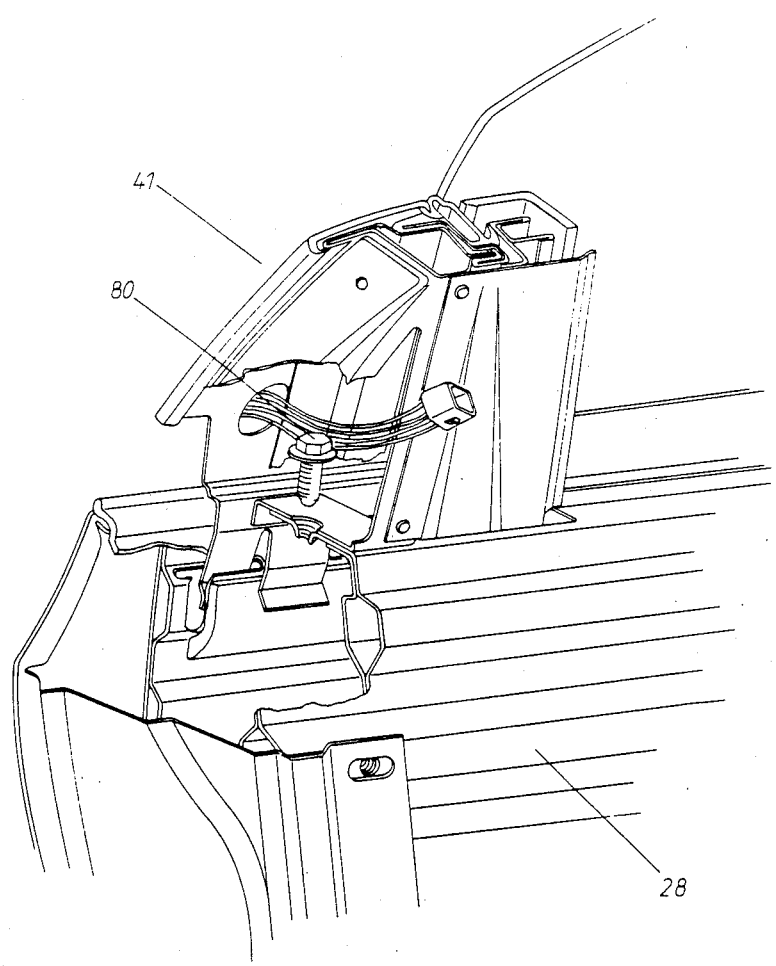
FIG. 13 is a drawing of sail area adjustment and fastening means.

The assembly procedure is as follows. As described above in relation to FIG. 1, the door structure (10) is adapted with slots (32) on which the module (12) is hung by means of loosely attached bolts (33). The adjusters (36) are inserted over and slid into the slots (30). At the front of the door, the sheet metal of the sail area (41) of the module (12) hooks into the outer belt reinforcement hat section (2) to secure and locate the sail are flush to the outer panel. As shown in FIG. 12, after the module (12) is hung on the door (10) it can be adjusted forward along the elongated upper slots (32) until a tab (48) depending from the sail area (41) abuts the hinge member (4). This forward adjustment ensures that the sail area (41) is aligned with the leading edge of the door (10). The sail area (41) is adapted to slide in and out over the inner belt reinforcement (28) as showed in FIG. 13. This permits adjustment of the sail area in and out to ensure that the sail area is flush to the outer panel. At this point the inner belt reinforcement member (28) can be secured by the top bolts (33) in holes (34) and slots (32) and such additional bolts or fasteners as are required to prevent sag and torsional deflection. Now the glass (14) is driven to the fully closed position.

As illustrated in FIG. 10, when the glass (14) is cranked to the fully up position the hooks (50) draw the glass flush with the lip (64) of the outer belt seal (62) and the outer panel (1). The adjustment bolt (70) can now be tightened to secure the position of the track (26). The sail area (41) can be secured to the top of the inner belt reinforcement member (28) by bolt (80) thereby locating the forward tracks (20) and (22).

Figure 14:
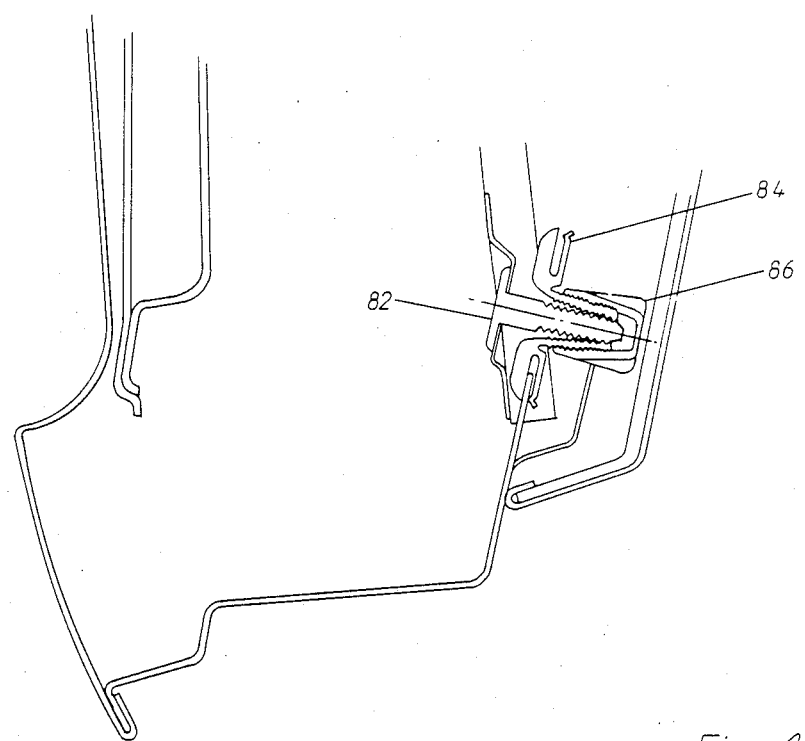
FIG. 14 is a cross-section drawing of the adjuster of the preferred embodiment of this invention.

The adjusters (36) as noted above are loosely connected in the bottom slots (30). By reference to FIGS. 14 and 15 it can be observed that each adjuster (36) comprises a threaded steel pin (82) and a molded plastic retainer (84) with ratchet teeth on both its inside and outside surfaces. The assembled door is next closed into its door frame in the car body. When the door closes into the door frame with the window up, it seats its perimeter on the sealing surfaces of the door frame. The sealing surfaces are adapted to seat the door outer panel (1) and the glass (14) flush to the body all about the door's perimeter. As the door is closed, it rotates about the inner belt reinforcement attachments and orients itself to properly seat in the door frame. Adjustments can be made to fine tune it to a flush position using suction cups. As illustrated in FIG. 14, as the door is positioned in the frame, the plastic ratchet retainer (84) adjusts itself over the threaded steel pin (82) and is temporarily fixed in position. The door can then be opened. As shown in FIG. 15, a locking cap (86) can be slid over the ratchet retainer (84) and rammed or screwed into place to lock the position of the module (12) at a position where the glass has been made flush. FIG. 14 illustrates the locking cap (86) locked in place. In this manner the door can be assembled to have flush mounted glass.

It will be appreciated by those skilled in the art that one can make changes in the particular apparatus and methods described herein without departing from the principles of this invention.

What is claimed is:

1. An automobile door adapted to be mounted in a door frame of an automobile body, said door comprising:
    a door shell, comprising:
        an outer panel,
        a hinge member and a latch member, and
        an outer belt reinforcing means attached inside the outer panel;
    an inner belt reinforcement means lying parallel to the door between the hinge member and the latch member of the door shell;
    a window fitting flush to the door frame and the centre panel;
    window sealing means lying between the window and adjacent parts of the door frame and the outer panel;
    a window drive means for moving the window;
    a window guide means for guiding the window throughout its motion;
    gripping means on the window releaseably interacting with the outer belt reinforcement member to stop and locate a bottom edge of the window flush to the outer panel; and
    adjustment means permitting adjustment of an upper edge of the window to be located flush to the door frame;
    wherein the module is fastened to the door structure by first fastening means located in the inner belt reinforcement means and by second fastening means disposed on the module at a location lower than the first fastening means, said second fastening means and the adjustment means permitting the module to be rotatably adjusted about a horizontal axis parallel to the door proximate to the inner belt reinforcement means to permit the upper edge of the window to be positioned flush to the door frame.

2. An automobile door adapted to be mounted in a door frame of an automobile body, said door comprising:
    a door shell, comprising:
        an outer panel,
        a hinge member and a latch member, and
        an outer belt reinforcing means attached inside the outer panel;
    an inner belt reinforcement means lying parallel to the door between the hinge member and the latch member of the door shell;
    a window fitting flush to the door frame and the centre panel;
    window sealing means lying between the window and adjacent parts of the door frame and the outer panel;
    a window drive means for moving the window;
    a window guide means for guiding the window throughout its motion;
    gripping means on the window releaseably interacting with the outer belt reinforcement member to stop and locate a bottom edge of the window flush to the outer panel; and
    adjustment means permitting adjustment of an upper edge of the window to be located flush to the door frame;
    wherein the module is fastened to the door structure by first fastening means located in the inner belt reinforcement means and by second fastening means disposed on the module at a location lower than the first fastening means, said second fastening means and the adjustment means permitting the window and the window guide means of the module to be rotatably adjusted about a horizontal axis parallel to the door proximate to the inner belt reinforcement means to permit the upper edge of the window to be positioned flush to the door frame.

3. An automobile door adapted to be mounted in a door frame of an automobile body, said door comprising:
    a door shell, comprising:
        an outer panel,
        a hinge member and a latch member, and
        an outer belt reinforcing means attached inside the outer panel;
    an inner belt reinforcement means lying parallel to the door between the hinge member and the latch member of the door shell;

a window fitting flush to the door frame and the centre panel;

window sealing means lying between the window and adjacent parts of the door frame and the outer panel;

a window drive means for moving the window;

a window guide means for guiding the window throughout its motion;

gripping means on the window releaseably interacting with the outer belt reinforcement member to stop and locate a bottom edge of the window flush to the outer panel; and adjustment means permitting adjustment of an upper edge of the window to be located flush to the door frame;

wherein the module is fastened to the door structure by first fastening means located in the inner belt reinforcement means and by second fastening means disposed on the module at a location lower than the first fastening means, said second fastening means and the adjustment means permitting the module to be rotatably adjusted about a horizontal axis parallel to the door proximate to the inner belt reinforcment means to permit the upper edge of the window to be positioned flush to the door frame;

wherein the module and the door shell permit the module to be slid rearward, forward, in and out before the fasteners are locked in place to permit initial adjustmment of the module to place the window in a correct location in the door shell and the lower edge of the window flush to the outer panel, thereby accommodating dimensional tolerances of parts.

4. An automobile door adapted to be mounted in a door frame of an automobile body, said door comprising:

a door shell, comprising:

an outer panel mounted on a hinge member and a latch member, and an outer belt reinforcing means attached inside the outer panel; a module, comprising:

an inner belt reinforcement means, a window fitting flush to the door frame and the outer panel;

an inner belt reinforcement means lying parallel to the door between the hinge member and the latch member of the door shell;

window sealing means lying between the window and adjacent parts of the door frame and the outer panel;

a window drive means for moving the window;

a window guide means for guiding the window throughout its motion;

gripping means on the window releaseably interacting with the outer belt reinforcement member to stop and locate a bottom edge of the window flush to the outer panel; and adjustment means permitting adjustment of an upper edge of the window to be located flush to the door frame;

said module being hung on the door shell by at least first fastening means located in the inner belt reinforcement means and second fastening means disposed on the module at a location lower than the first fastening means, the module and the door shell permitting the module to be slid rearward, forward, in and out before the fastening means are locked in place to allow initial adjustment of the module to place the window in a correct location in the door shell and to permit the gripping means to draw the lower edge of the window flush to the outer panel as the window is closed, thereby accommodating dimensional tolerances of the door parts, said second fastening means and the adjustment means permitting the module to be rotatably adjusted about a horizontal axis proximate to the inner belt reinforcement means to permit the upper edge of the window to be positioned flush to the door frame.

5. The apparatus of claim 4, wherein the gripping means is attached along a bottom edge of the window and comprises hooks and stops, to releaseably catch in the outer belt reinforcement means as the window is driven upward to a closed position;

wherein the anchor means is attached along the bottom edge of the window and connects to the drive means; and wherein the window guide means comprises:

at least first, second and third follower means attached to the window; and at least first, second and third track means guiding at least first, second and third follower means during the up and down motion of the window, said second follower means being displaced vertically below said first follower means and horizontally forward of said third follower means, said first and second track means and said first and second follower means controlling rotation of the window about the horizontal axis and said third track means and said third follower means controlling rotation about a vertical axis, said second and third track means being directed outwardly near the belt line to guide the bottom of the window towards the outer panel as it nears the closed position to allow the gripping means to interact with the outer belt reinforcement means.

6. The apparatus of claim 5 in which the window drive means is a cable and pulley system being attached to the window of anchors located near the second follower means and the third follower means.

7. The apparatus of claim 5 in which the window drive means comprises:

cables attached to the window at anchors located near the second follower means and the third follower means, said cables crossing in an "X" pattern near the centre of the door where they connect to a driver; and top and bottom pulleys positioned proximate to the opposite ends of each of the second and third track means to guide the cables such that at least one anchor is located above a top pulley and at least another anchor is below a top pulley when the window is fully closed.

8. An automobile door adapted to be mounted in a door frame of an automobile body, said door comprising:

a door shell, comprising:

an outer panel, a hinge member and a latch member, and an outer belt reinforcing means attached inside the outer panel;

an inner belt reinforcement means lying parallel to the door between the hinge member and the latch member of the door shell;

a window fitting flush to the door frame and the centre panel;

window sealing means lying between the window and adjacent parts of the door frame and the outer panel;

a window drive means for moving the window;

a window guide means for guiding the window throughout its motion;

gripping means on the window releaseably interacting with the outer belt reinforcement member to stop and locate a bottom edge of the window flush to the outer panel; and adjustment means permitting adjustment of an upper edge of the window to be located flush to the door frame;

wherein a sail area vertical seal is located at the front of the window along an L-shaped reinforcing member attached to the window and supporting first and second roller pins, said sail area vertical seal being attached to the module and being biased forwardly against the L-shaped member when the window is fully up, to wipe the L-shaped member as the window retracts downwardly and inwardly and to lap over the fully retracted window to seal against the module over the first track means.

9. An automobile door adapted to be mounted in a door frame of an automobile door adapted to be mounted in a door frame of an autombile body, said door comprising:

a door shell, comprising:
an outer panel,
a hinge member and a latch member, and
an outer belt reinforcing means attached inside the outer panel;

an inner belt reinforcement means lying parallel to the door between the hinge member and the latch member of the door shell;

a window fitting flush to the door frame and the centre panel;

window sealing means lying between the window and adjacent parts of the door frame and the outer panel;

a window drive means for moving the window;

a window guide means for guiding the window throughout its motion;

gripping means on the window releaseably interacting with the outer belt reinforcement member to stop and locate a bottom edge of the window flush to the outer panel; and adjustment means permitting adjustment of an upper edge of the window to be located flush to the door frame;

wherein the module has a sail area with a side seal means adapted to seal the front edge of the window, said side sail means being composed of an elastic material having a rectangular box shape in a plan view permitting the window to wipe in and out against the flat side of the seal abutting the window edge as the window moves up and down.

10. An automobile door adapted to be mounted in a door frame of an automobile body, said door comprising:

a door shell, comprising:
an outer panel,
a hinge member and a latch member, and
an outer belt reinforcing means attached inside the outer panel;

an inner belt reinforcement means lying parallel to the door between the hinge member and the latch member of the door shell;

a window fitting flush to the door frame and the centre panel;

window sealing means lying between the window and adjacent parts of the door frame and the outer panel;

a window drive means for moving the window;

a window guide means for guiding the window throughout its motion;

gripping means on the window releaseably interacting with the outer belt reinforcement member to stop and locate a bottom edge of the window flush to the outer panel; and adjustment means permitting adjustment of an upper edge of the window to be located flush to the door frame;

wherein the adjustment means comprises:
a threaded pin fixed to the module; and
a locking cap and a retainer, said retainer connecting into the door shell to be secured therein against movement towards the inside or outside of the door, said retainer receiving the threaded pin in female connection against a surface permitting but resisting relative movement of the pin and the retainer, said retainer locking onto said pin when the locking cap is secured over said retainer.

11. An automobile door adapted to be mounted in a door frame of the automobile body, said door comprising:

(a) a door shell comprising:
(1) an outer panel mounted on a hinge member and a latch member;
(2) an outer belt reinforcing means attached inside the outer panel; and
(3) an outer belt sealing means bonded to the inside of the outer panel and the outer belt reinforcement means, said outer belt sealing means comprising a flap terminating in a lip being biased inwardly and downwardly to wipe the window as it moves past the seal and to lie over the window when it is fully down, but being bent upwardly as the window rises and being pushed flush between the outer panel and the window by a step means attached to the bottom of the window, and (b) a module comprising:
(1) an inner belt reinforcement means,
(2) a window fitting flush to the door frame and the outer panel comprising:
(i) at least first, second and third follower means attached to the window, said second follower means being displaced vertically below said first follower means and horizontally forward of said third follower means;
(ii) gripping means attached along a bottom edge of the window, said gripping means comprising hooks and stops, releaseably catching in the outer belt reinforcement means as the window is driven upward to a closed position to stop and locate a bottom edge of the window flush to the outer panel;

(iii) anchor means attached along the bottom edge of the window and connecting to a drive means;

(3) window sealing means lying between the window and adjacent parts of the door frame and the outer panel;

(4) an inner belt seal being biased downwardly to wipe the window as it moves past the seal and to lie over the fully lowered window but being pushed upwardly by the rising window and, when the window is fully up, lying against a curved seat located on the inside, bottom portion of the window;

(5) a vertical seal located on the front of the window along an L-shaped reinforcing member attached to the window and supporting first and second roller pins, said sail area vertical seal being attached top the module and being biased forwardly against the L-shaped member when the window is fully up, to wipe the L-shaped member as the window retracts downwardly and inwardly and to lap over the fully retracted window to seal against the module over the first track means;

(6) a sail area with a side seal means sealing the front edge of the window, said side sail means being composed of an elastic material having a rectangular box shape in a plan view permitting the window to wipe in and out against the flat side of the seal abutting the window edge as the window moves up and down;

(7) a window drive means moving the window, comprising:
a cable and pulley system having cables attached to the window at anchors located near the second and third follower means, said cables crossing in an "X" pattern near the centre of the door where the connect to a driver means and having top and bottom pulleys positioned proximate to the opposite ends of each of second and third track means to guide the cables such that at least one anchor is located above a top pulley and at least another anchor is below a top pulley when the window is fully closed;

(8) a window guide means for guiding the window throughout its motion, comprising:
at least first, second and third track means for guiding at least first, second and third follower means during the up and down motion of the window, said first and second track means controlling rotation of the window about a horizontal axis, said third track means controlling rotation about a vertical axis, said second and third track means being directed outwardly near the belt line to guide the bottom of the window towards the outer panel as it nears the closed position to allow the gripping means to interact with the outer belt reinforcement means;

(9) adjustment means, comprising:
a threaded pin fixed to the module;
a locking cap and a retainer, said retainer connecting into the door shell to be secured therein against movement towards the inside or outside of the door, said retainer receiving the threaded pin in female connection against a surface permitting but resisting relative movement of the pin and the retainer, said retainer locking onto said pin when the locking cap is secured over said retainer, said adjustment means permitting adjustment of an upper edge of the window to be locked flush to the door frame;

wherein said module is hung on the door shell by at least first fastening means located in the inner belt reinforcement means and the adjustment means disposed on the module at a location lower than the first fastening means, wherein the module and the door shell permit the module to be slid rearward, forward, in and out before the fastening means are locked in place to allow initial adjustment of the module to place the window in a correct location in the door shell and to permit the gripping means to draw the lower edge of the window flush to the outer panel as the window is closed, thereby accommodating dimensional tolerances of the door parts.

12. A method of assembly of a door practiced with a door shell and a door module, wherein the door shell includes an outer panel mounted on a hinge member and a latch member, the hinge member and latch member each having slots running parallel to the door; an outer belt reinforcing means attached inside the outer panel; and an outer belt sealing means bonded to the inside of the outer panel and the outer panel reinforcement means, wherein said module includes an inner belt reinforcement means, a window; at least first, second and third follower means attached to the window, the second follower means being displaced vertically below the first follower means and horizontally foward of the third follower means; gripping means attached along a bottom edge of the window, wherein the gripping means includes hooks and stops which catch releaseably in the outer belt reinforcement means as the window is driven up to a closed position to direct the window flush to the outer panel; window drive means to move the window up and down in the door; a window guide means for guiding the window throughout its motion; and upper fastening means and lower adjustment means to secure and adjust the module within the door shell; said method comprising the steps of:

(a) hanging the door module on the door shell with upper fastening means of the door module loosely fitted in slots of the door shell, (b) adjusting the module forward along the upper slot to abut the hinge member, (c) securing the fasteners of the inner belt reinforcement member, (d) driving the window to the fully closed position so that the hooks draw the lower part of the window flush to the outer belt panel, p1 (e) securing the position of the track means, (f) closing the door into the door frame of the body and adjusting the window to be flush to the door frame, and (g) opening the door and fixing the position of the adjustment means in the lower slots.

* * * * *